United States Patent
Tada

(10) Patent No.: US 8,698,435 B2
(45) Date of Patent: Apr. 15, 2014

(54) MOTOR DRIVE DEVICE

(75) Inventor: Tsuyoshi Tada, Kasugai (JP)

(73) Assignee: Omron Automotive Electronics Co., Ltd., Aichi (JP)

(*) Notice: Subject to any disclaimer, the term of this patent is extended or adjusted under 35 U.S.C. 154(b) by 342 days.

(21) Appl. No.: 13/111,604

(22) Filed: May 19, 2011

(65) Prior Publication Data

US 2011/0285335 A1   Nov. 24, 2011

(30) Foreign Application Priority Data

May 19, 2010   (JP) .................. 2010-115091

(51) Int. Cl.
   H02H 7/08   (2006.01)

(52) U.S. Cl.
   USPC .......... 318/400.21; 701/41; 701/43; 701/534; 318/400.26; 318/400.27; 318/400.28; 318/801; 108/213; 108/214; 108/216; 108/232

(58) Field of Classification Search
   USPC .......... 318/400.01, 400.27, 400.26, 432, 490, 318/599, 700, 400.21, 400.22, 400.28, 801; 180/213, 214, 216, 232, 412; 701/41, 701/43, 534; 361/23, 91.8, 93.8, 93.9, 100, 361/103; 714/100
   See application file for complete search history.

(56) References Cited

U.S. PATENT DOCUMENTS

| | | | |
|---|---|---|---|
| 5,920,174 A * | 7/1999 | Kawada et al. | 318/663 |
| 6,973,992 B2 | 12/2005 | Yoneda et al. | |
| 7,791,293 B2 * | 9/2010 | Nagase et al. | 318/400.01 |
| 8,169,174 B2 * | 5/2012 | Shibata | 318/434 |
| 2003/0156439 A1 * | 8/2003 | Ohmichi et al. | 363/98 |

FOREIGN PATENT DOCUMENTS

| | | | | |
|---|---|---|---|---|
| JP | 9-289792 A | 11/1997 | | |
| JP | 2002369587 A | 12/2002 | | |
| JP | 2004330877 A | 11/2004 | | |
| JP | 2005-199746 A | 7/2005 | | |
| JP | 3686471 A | 8/2005 | | |
| JP | 2006-21645 A | 1/2006 | | |
| JP | 2006021645 A | * 1/2006 | | H02P 3/02 |
| JP | 3884450 A | 2/2007 | | |
| JP | 2009-220705 A | 10/2009 | | |
| JP | 2009-274686 A | 11/2009 | | |

OTHER PUBLICATIONS

Patent Abstract for Japanese Publication No. 2005-199746 Published Jul. 28, 2005 (1 page).
Patent Abstract for Japanese Publication No. 9-289792 Published Nov. 4, 1997 (1 page).

(Continued)

*Primary Examiner* — Anthony M Paul
(74) *Attorney, Agent, or Firm* — Osha Liang LLP

(57) ABSTRACT

A motor drive device includes an inverter circuit, a driver circuit for outputting a PWM signal to the inverter circuit, a booster circuit for boosting a power supply voltage supplied from a power supply circuit, a fail safe circuit arranged between the inverter circuit and the motor, and a fail safe drive unit for outputting a signal for turning ON/OFF a semiconductor switching element of the fail safe circuit. A boost voltage output from the booster circuit is supplied to the driver circuit and also supplied to the fail safe drive unit. The fail safe drive unit drives the semiconductor switching element of the fail safe circuit by such boost voltage.

3 Claims, 9 Drawing Sheets

(56) References Cited

OTHER PUBLICATIONS

Patent Abstract for Japanese Publication No. 2006-21645 Published Jan. 26, 2006 (1 page).
Patent Abstract for Japanese Publication No. 2009-220705 Published Oct. 1, 2009 (1 page).
Patent Abstract for Japanese Publication No. 2009-274686 Published Nov. 26, 2009 (1 page).
Office Action in corresponding Chinese application No. 201110125088.6 dated Dec. 16, 2013 (7 pages).
Office Action in corresponding Japanese application No. 2010-115091 dated Nov. 26, 2013 (6 pages).

* cited by examiner

MOTOR DRIVE DEVICE

BACKGROUND OF THE INVENTION

1. Technical Field

One or more embodiments of the present invention relate to a motor drive device including an inverter circuit driven by a PWM (Pulse Width Modulation) signal, and in particular, to a generation unit of a boost voltage for driving a semiconductor switching element for fail safe arranged between the inverter circuit and the motor.

2. Related Art

In an electrical power steering device of a vehicle, an electrical motor such as a three phase brushless motor is arranged to provide a steering assisting force corresponding to the steering torque of the handle to a steering mechanism. A motor drive device by the PWM control method is known for the device for driving the motor.

The motor drive device of the PWM control method generally includes an inverter circuit driven by a PWM signal having a predetermined duty. The inverter circuit is configured by a so-called three phase bridge in which three sets of a pair of upper and lower arms including a semiconductor element on the upper arm and the lower arm are arranged. The voltage of each phase is supplied from the inverter circuit to the motor to thereby drive the motor when each switching element carries out the ON/OFF operation based on the PWM signal.

A motor drive device in which a fail safe mechanical relay is arranged between the inverter circuit and the motor to prevent current from flowing from the inverter circuit to the motor (or from the motor to the inverter circuit) when failure of the circuit is detected is also known (e.g., Japanese Patent Publication No. 3686471 and Japanese Unexamined Patent Publication No. 2005-199746).

Such a failure of the circuit includes various failures that occur in the motor drive device. For instance, the failure may be an ON failure in which each switching element of the inverter circuit does not change from the ON state to the OFF state and remains in the ON state, or a short circuit failure that occurs at the wiring portion other than in the switching element. In addition, the failure may be such in which abnormality occurs inside the CPU that controls the inverter circuit and the CPU carries out a control different from the original control.

When such failure of the circuit is detected, a control in which the switching elements of the inverter circuit are all set to the OFF state or a control in which a power supply relay arranged between the inverter circuit and the vehicle battery is set to the OFF state is carried out. The power supply to the inverter circuit and the motor is thereby stopped, so that breakage of the inverter circuit, false operation such as assistance being carried out in the direction not predicable by the driver, or the like can be prevented.

When the failure of the circuit is detected, the driver steers the handle by human power because the steering assisting force by the motor is not applied. In this case, the handle and the motor mechanically interlock and turn in the electrical power steering device, thus enabling the assistance of the steering by the motor. Therefore, the motor rotates in cooperation with the steering of the handle and the motor functions as a power generator when steering with human power. Therefore, a large resistance applies on the handle operation by the power generating operation of the motor if the motor and the inverter circuit remain electrically connected. That is, a great amount of force will be required to turn the handle. The fail safe mechanical relay for electrically disconnecting the inverter circuit and the motor is thus installed as in Japanese Patent Publication No. 3686471 and Japanese Unexamined Patent Publication No. 2005-199746 to prevent such a drawback.

However, in the electrical power steering device, there is a demand to further miniaturize the control circuit although the supply power to the motor is large because the control circuit is to be mounted in the vehicle. Therefore, if the mechanical relay is used as in Japanese Patent Publication No. 3686471 and Japanese Unexamined Patent Publication No. 2005-199746, the relay itself becomes large and such a demand cannot be met. A motor drive device in which a fail safe semiconductor switching element is arranged between the inverter circuit and the motor in place of the mechanical relay as described in Japanese Patent Publication No. 3884450 is thus known.

In the motor drive device of patent document, an N-channel MOS-FET (Metal Oxide Semiconductor Field Effect Transistor) is arranged on a power supply line between the motor and the inverter circuit, where the MOS-FET of each power supply line is turned OFF when abnormality occurs to shield the motor from the inverter circuit.

When driving the N-channel MOS-FET, a high voltage in which the power supply voltage is boosted needs to be applied to the gate in the circuit configuration in which the potential of the source becomes substantially the same as the power supply voltage at the time of conduction (ON). Thus, in the motor drive device of Japanese Patent Publication No. 3884450, a booster circuit is arranged for every N-channel MOS-FET installed on each power supply line between the motor and the inverter circuit. The voltage boosted in the booster circuit is then supplied to the gate of the fail safe MOS-FET. However, in such configuration, the booster circuit for driving the fail safe MOS-FET needs to be independently arranged and the booster circuit needs to be arranged by the number of power supply lines, which complicates the circuit configuration.

SUMMARY OF INVENTION

One or more embodiments of the present invention may provide a motor drive device capable of electrically shielding the motor and the inverter circuit when failure is detected and capable of simplifying the circuit configuration. A motor drive device according to one or more embodiments of the present invention include an inverter circuit, in which a plurality of sets of a pair of upper and lower arms having a semiconductor switching element on an upper arm and a lower arm respectively is arranged, for supplying power to a motor based on an ON/OFF operation of each semiconductor switching element by a PWM signal; a driver circuit for outputting the PWM signal to each semiconductor switching element of the inverter circuit; a booster circuit for boosting a power supply voltage, and supplying the boost voltage to the driver circuit; a semiconductor switching element for fail safe, arranged between the inverter circuit and the motor, for shielding current flow from the inverter circuit to the motor; and a fail safe drive unit for outputting a signal for turning ON/OFF the semiconductor switching element for fail safe. The boost voltage output from the booster circuit is also supplied to the fail safe drive unit. The fail safe drive unit drives the semiconductor switching element for fail safe by the boost voltage supplied from the booster circuit.

According to such a configuration, the boost voltage supplied from the booster circuit to the driver circuit can be used as the boost voltage for driving the semiconductor switching element for fail safe. Therefore, a booster circuit does not need to be separately arranged for the semiconductor switching element for fail safe, whereby the circuit configuration can be simplified.

In one or more embodiments of the present invention, a control unit for outputting a command signal for turning ON or OFF the semiconductor switching element for fail safe with respect to the fail safe drive unit may be arranged. In this case, the fail safe drive unit includes a drive signal generating portion for generating a drive signal corresponding to the command signal of the control unit, and a semiconductor switching element for control which is turned ON/OFF by the drive signal generated by the drive signal generating portion. The semiconductor switching element for fail safe is driven by the boost voltage based on the operation of the semiconductor switching element for control. The semiconductor switching element for fail safe is thereby driven by the boost voltage in response to the command signal from the control unit.

In one or more embodiments of the present invention, each semiconductor switching element of the inverter circuit is, for example, configured by an N channel MOS-FET (Metal Oxide Semiconductor Field Effect Transistor). Furthermore, the driver circuit for example includes an upper stage driver circuit for outputting the PWM signal with respect to an MOS-FET arranged on the upper arm of the inverter circuit, and a lower stage driver circuit for outputting the PWM signal with respect to an MOS-FET arranged on the lower arm of the inverter circuit. In this case, the booster circuit supplies a boost voltage to the upper stage driver circuit and the fail safe drive unit. Therefore, the boost voltage output from the booster circuit to the driver circuit is supplied only to the upper stage driver circuit for driving the MOS-FET of the upper arm that requires a gate voltage higher than the MOS-FET of the lower arm.

In one or more embodiments of the present invention, the booster circuit and the driver circuit may be configured by a single ASIC (Application Specific Integrated Circuit). With this configuration, the inverter drive unit configured by the booster circuit and the driver circuit thus can be miniaturized.

In one or more embodiments of the present invention, when the booster circuit and the driver circuit are configured by a single ASIC, the control unit may include a first control unit and second control unit. The first control unit is arranged separate from the ASIC, and the second control is arranged inside the ASIC. When a command signal input from the first control unit and a command signal input from the second control unit are both signals instructing to turn ON the semiconductor switching element for fails safe, the fail safe drive unit turns ON the semiconductor switching element. Therefore, when either one (or both) of the first control unit and the second control unit break down, the fail safe drive unit does not turn ON the semiconductor switching element for fail safe, and hence the current flow to the motor is shielded and the reliability is enhanced.

Further, in one or more embodiments of the present invention, an abnormality detector for detecting abnormality; and an abnormality control circuit for turning OFF the semiconductor switching element for fail safe when abnormality is detected by the abnormality detector may be arranged. Therefore, when abnormality occurs, the semiconductor switching element for fail safe is turned OFF by the abnormality control unit, so that the current flow from the inverter circuit to the motor is shielded and the fail safe function is guaranteed.

In this case, the abnormality control circuit may be arranged with respect to each semiconductor switching element for fail safe. Therefore, even if one of the abnormality control circuits breaks down, the semiconductor switching element for fail safe corresponding to other abnormality control circuits can be turned OFF, and hence the fail safe function can be further enhanced.

According to one or more embodiments of the present invention, the circuit configuration of the motor drive device can be simplified because the booster circuit for driving the semiconductor switching element for fail safe can be omitted.

DETAILED DESCRIPTION

Figure 1:
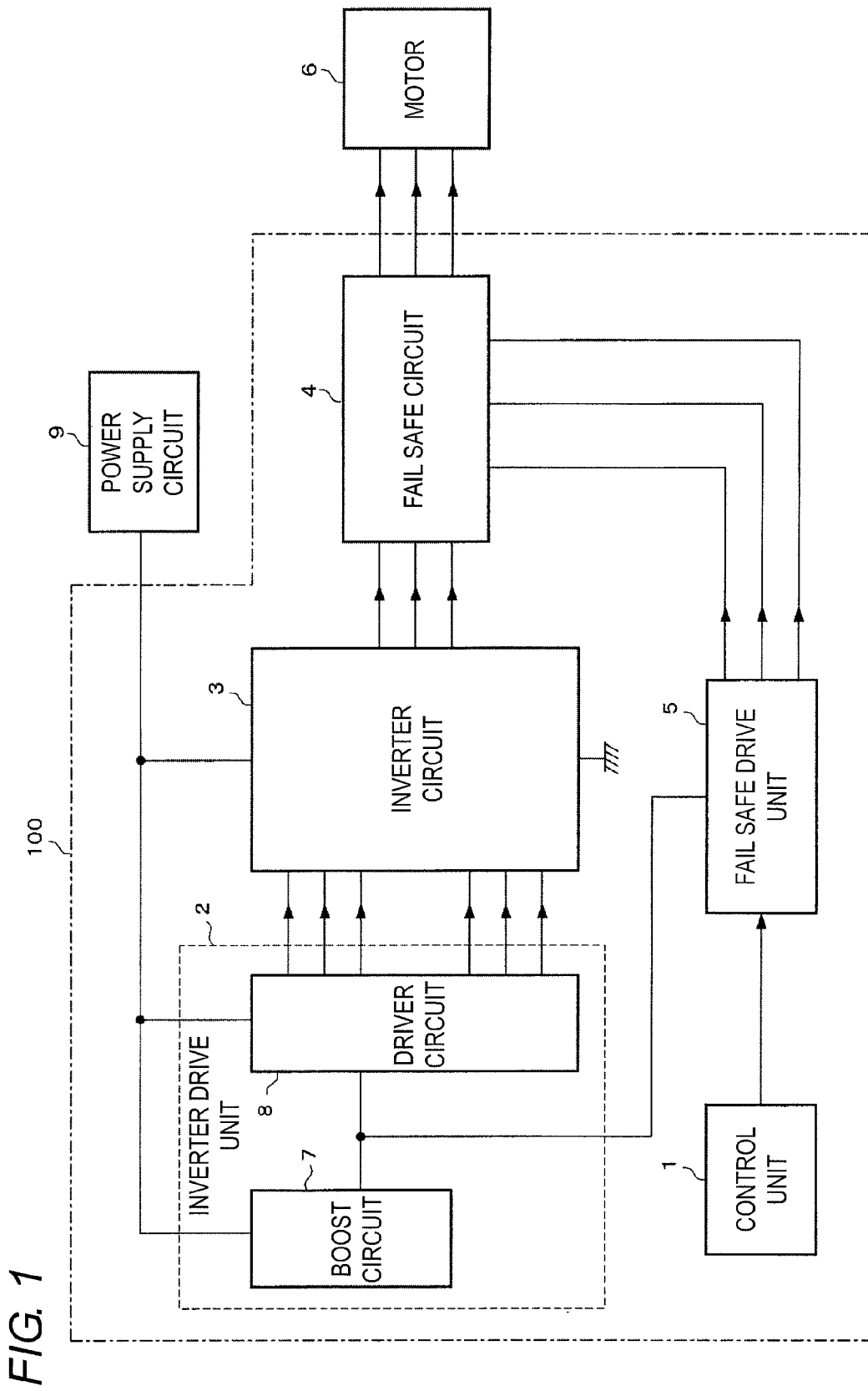
FIG. 1 is a block diagram of a motor drive device according to a first embodiment of the present invention.

Hereinafter, embodiments of the present invention will be described with reference to the drawings. A motor drive device used in an electrical power steering device of a vehicle will be described by way of example. In the drawings, the same reference numerals are denoted for the same portions or the corresponding portions. In embodiments of the invention, numerous specific details are set forth in order to provide a more thorough understanding of the invention. However, it will be apparent to one with ordinary skill in the art that the invention may be practiced without these specific details. In other instances, well-known features have not been described in detail to avoid obscuring the invention.

First, the schematic configuration of a motor drive device according to a first embodiment of the present invention will be described with reference to a block diagram of FIG. 1. In FIG. 1, a motor drive device 100 includes a control unit 1, an inverter drive unit 2, an inverter circuit 3, a fail safe circuit 4, and a fail safe drive unit 5. The inverter drive unit 2 includes a booster circuit 7 and a driver circuit 8. The power is supplied from a power supply circuit 9 to the motor drive device 100. A motor 6 driven by the motor drive device 100 is a three-phase brushless motor, for example.

Figure 2:
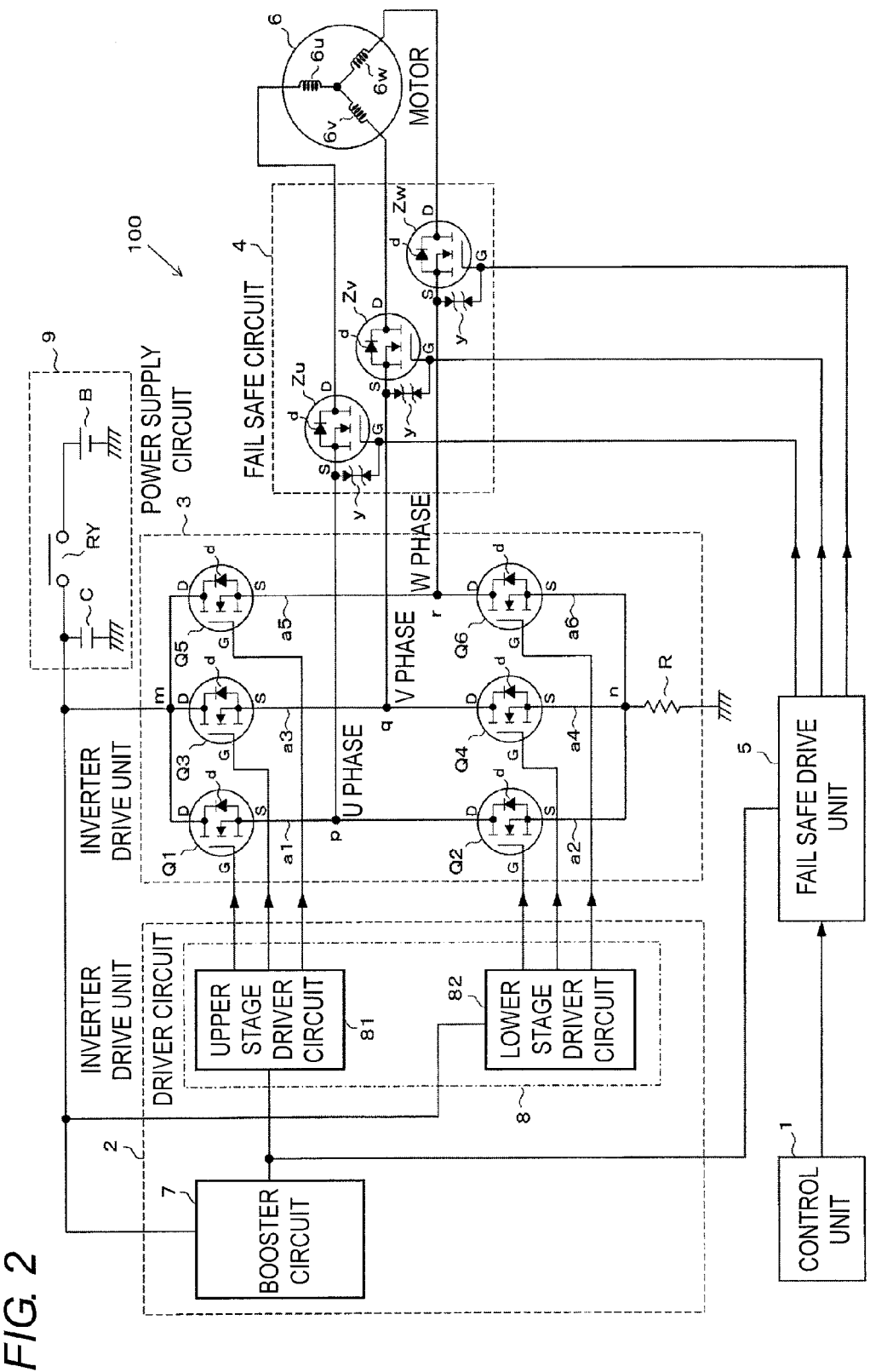
FIG. 2 is a circuit diagram showing a specific configuration of the motor drive device of the first embodiment of the present invention.

FIG. 2 is a view showing a specific configuration of the motor drive device 100. The inverter circuit 3 is configured by a three phase bridge in which three sets of a pair of upper and lower arms including a semiconductor switching element (hereinafter referred to as "switching element") on an upper arm and a lower arm are arranged in correspondence with a U phase, a V phase, and a W phase. An upper arm a1 and a lower arm a2 of the U phase each includes a switching element Q1 and Q2, an upper arm a3 and a lower arm a4 of the V phase each includes a switching element Q3 and Q4, and an upper arm a5 and a lower arm a6 of the W phase each includes a switching element Q5 and Q6. The U phase voltage is retrieved from a connection point p of the switching elements Q1 and Q2, the V phase voltage is retrieved from a connection point q of the switching elements Q3 and Q4, and the W phase voltage is retrieved from a connection point r of the switching elements Q5 and Q6.

In the one or more embodiments of the present invention, the switching elements Q1 to Q6 are configured by an N-channel MOS-FET. In each switching element, S represents source, D represents drain, G represents gate, and d represents parasitic diode existing between the source S and the drain D. A conducting direction of the parasitic diode d is the direction opposite to the conducting direction (drain D→source S) of each switching element Q1 to Q6. Each drain D of the switching elements Q1, Q3 and Q5 are commonly connected, and a connection point m thereof is connected to the power supply circuit 9. Each source S of the switching element Q2, Q4 and Q6 are commonly connected, and a connection point n thereof is connected to the ground through a current detection resistor R. The power supply voltage is supplied from the power supply circuit 9 to the inverter circuit 3.

Six types of PWM signals output from the inverter drive unit 2 are individually provided to each gate G of the switching element Q1 to Q6 of the inverter circuit 3. The switching elements Q1 to Q6 perform the ON/OFF operation based on the PWM signal, and as a result, three phase voltage of the U phase voltage, the V phase voltage, and the W phase voltage described above are output from the inverter circuit 3. The three phase voltage is supplied to the motor 6 through the fail safe circuit 4.

The fail safe circuit 4 is arranged between the inverter circuit 3 and the motor 6, and includes a switching element Zu on a power supply line of the U phase voltage, a switching element Zv on a power supply line of the V phase voltage, and a switching element Zw on a power supply line of the W phase voltage. In the one or more embodiments of the present invention, each switching element Zu, Zv and Zw is configured by an N-channel MOS-FET, similar to the switching elements Q1 to Q6 of the inverter circuit 3. In each switching element, S represents source, D represents drain, G represents gate, d represents parasitic diode existing between the source S and the drain D, and y represents a zener diode for protection connected between the source S and the gate G.

The source S of the switching element Zu is connected to a connection point p of the switching elements Q1 and Q2, the source S of the switching element Zv is connected to a connection point q of the switching element Q3 and Q4, and the source S of the switching element Zw is connected to a connection point r of the switching elements Q5 and Q6. The drain D of the switching element Zu is connected to a U phase winding 6u of the motor 6, the drain D of the switching element Zv is connected to a V phase winding 6v of the motor 6, and the drain D of the switching element Zw is connected to a W phase winding 6w of the motor 6.

A control signal is input from the fail safe drive unit 5 to each gate G of the switching elements Zu, Zv and Zw of the fail safe circuit 4. The fail safe drive unit 5 outputs the control signal of "H" (High) level when turning ON the switching elements Zu, Zv and Zw, and outputs the control signal of "L" (Low) level when turning OFF the switching elements Zu, Zv and Zw. The switching elements Zu, Zv and Zw carry out the ON/OFF operation based on the control signal. The power supply from the inverter circuit 3 to the motor 6 is carried out when the switching elements Zu, Zv and Zw are in the ON state, and the power supply from the inverter circuit 3 to the motor 6 is shielded when the switching elements Zu, Zv and Zw are in the OFF state.

The inverter drive unit 2 is configured by a single ASIC. The booster circuit 7 and the driver circuit 8 are arranged inside the ASIC. The driver circuit 8 is configured by an upper state driver circuit 81 and a lower driver circuit 82. The upper stage driver circuit 81 is a driver circuit for driving the switching elements (hereinafter referred to as "upper stage switching element") Q1, Q3 and Q5 of the upper arm of the inverter circuit 3. The lower stage driver circuit 82 is a driver circuit for driving the switching elements (hereinafter referred to as "lower stage switching element") Q2, Q4 and Q6 of the lower arm of the inverter circuit 3.

The booster circuit 7 boosts the power supply voltage from the power supply circuit 9 to generate a boost voltage, and supplies the boost voltage to the upper stage driver circuit 81 and also to the fail safe drive unit 5. The details of the booster circuit 7 will be described later. The power supply voltage from the power supply circuit 9 is supplied as is to the lower stage driver circuit 82 without passing the booster circuit 7. The boost voltage by the booster circuit 7 is not supplied to the lower stage driver circuit 82, and is supplied only to the upper stage driver circuit 81 for the following reasons.

When the N-channel MOS-FET is used for the switching elements of the inverter circuit 3, the potential of the source S becomes substantially the same as the power supply voltage at the time of conduction (ON time) for the upper stage switching elements Q1, Q3 and Q5 on the power supply circuit 9 side, and thus a voltage higher than the power supply voltage needs to be applied to the gate G. For instance, if the power supply voltage of the power supply circuit 9 is 12 [V], the gate voltage (e.g., 32±3 [V]) of about two to three times of the power supply voltage is actually required to drive the upper stage switching elements Q1, Q3 and Q5 in view of the voltage fluctuation of the battery. The source S becomes low potential at the time of conduction (ON time) for the lower stage switching elements Q2, Q4 and Q6 on the ground side, and thus a high gate voltage is not required. The boost voltage of the booster circuit 7 is supplied to the upper stage driver circuit 81, so that the upper stage switching elements Q1, Q3 and Q5 can be driven at high voltage.

The potential of the source S becomes substantially the same as the power supply voltage at the time of conduction (ON time) for the switching elements Zu, Zv and Zw of the fail safe circuit 4 as well, and thus a voltage higher than the power supply voltage needs to be applied to the gate. The boost voltage of the booster circuit 7 is thus supplied to the fail safe drive circuit that drives the switching elements Zu, Zv and Zw, which will be described in detail later.

The control unit 1 is configured by a CPU, and calculates the detection current value of the motor current based on the voltage generated at the current detection resistor R, and also calculates the target current value of the motor current based on the steering torque input from then torque sensor (not shown). The duty of the PWM signal of each phase is set from the detection current value and the target current value, and the command signal for generating the PWM signal of such duty is output to the inverter drive unit 2. Three types of command signals corresponding to the upper stage switching elements Q1, Q3 and Q5 of each phase are input from the control unit 1 to the upper stage driver circuit 81 of the inverter drive unit 2, and three types of command signals corresponding to the lower stage switching elements Q2, Q4 and Q6 of each phase are input from the control unit 1 to the lower stage driver circuit 82. The signal from the control unit 1 to each driver circuit 81 and 82 is omitted for simplification in FIG. 2 (similarly in FIGS. 6, 8 and 9).

The upper stage driver circuit 81 generates three types of PWM signals having a predetermined duty based on the command signal provided from the control unit 1, and outputs such PWM signals to each gate G of the upper stage switching elements Q1, Q3 and Q5 of the inverter circuit 3. The lower stage driver circuit 82 generates three types of PWM signals having a predetermined duty based on the command signal provided from the control unit 1, and outputs such PWM signals to each gate G of the lower stage switching elements Q2, Q4 and Q6 of the inverter circuit 3.

The power supply circuit 9 includes an in-vehicle battery B, a power supply relay RY, and a capacitor C. The voltage (e.g., 12 [V]) of the battery B is supplied to the inverter circuit 3, as well as the booster circuit 7 and the lower stage driver circuit 82 of the inverter circuit 2 as power supply voltage. The opening and closing of the power supply relay RY is controlled by the control unit 1.

Figure 3:
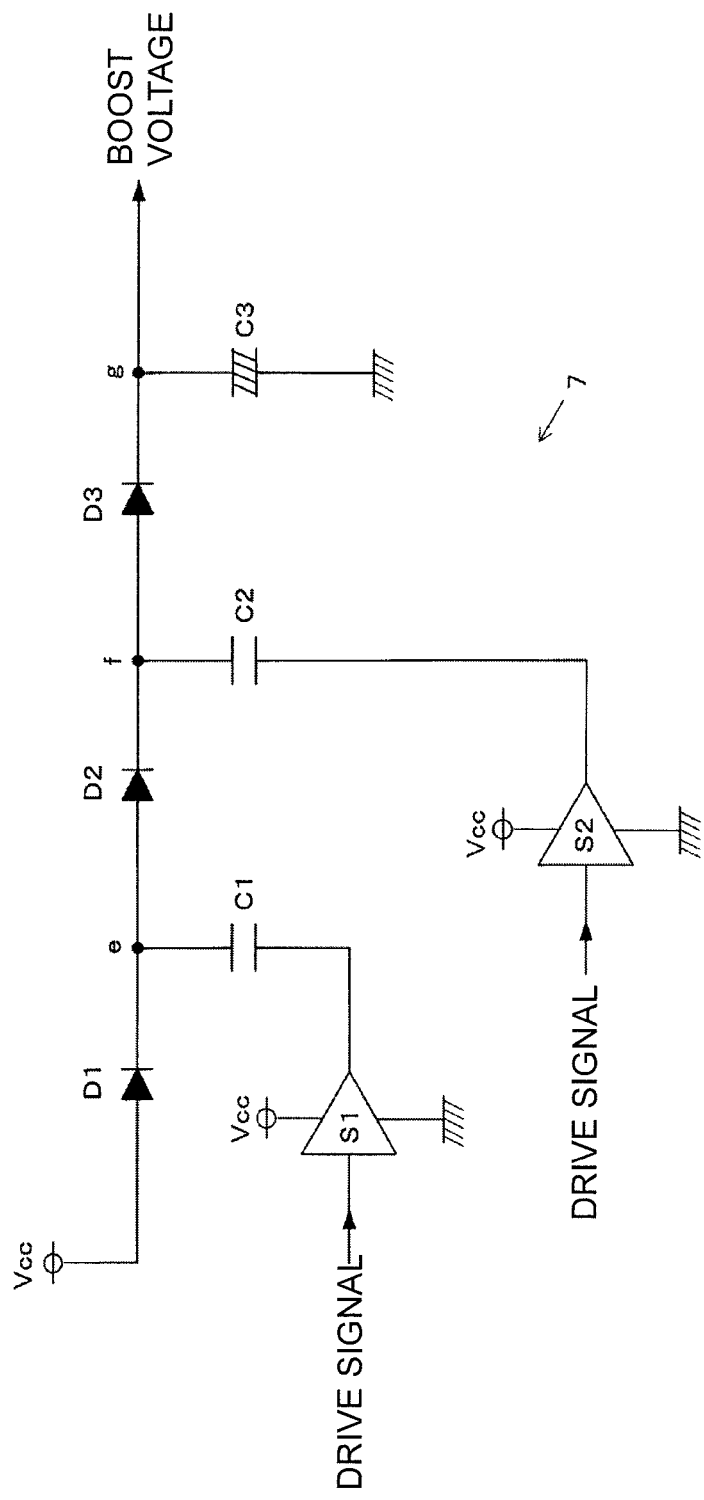
FIG. 3 is a circuit diagram showing one example of a booster circuit according to one or more embodiments of the present invention.

The details of the booster circuit 7 will be described with reference to FIG. 3. The booster circuit of the known charge pump type will be described here by way of example. In FIGS. 3, D1 to D3 indicate diodes, C1 and C2 indicate charging capacitors, C3 indicates a smoothing capacitor (electrolytic capacitor), and S1 and S2 indicate a switch circuit of push pull method. Vcc represents the power supply voltage supplied from the power supply circuit 9 (FIG. 2). The anode of the diode D1 is connected to the input terminal of the power supply voltage Vcc, and the cathode is connected to the anode of the diode D2. The diodes D1 to D3 are connected in series in the same direction.

One of the terminals of the capacitor C1 is connected to a connection point e of the cathode of the diode D1 and the anode of the diode D2. And the other terminal of the capacitor C1 is connected to the output side of the switch circuit S1. One of the terminals of the capacitor C2 is connected to a connection point f of the cathode of the diode D2 and the anode of the diode D3, and the other terminal of the capacitor C2 is connected to the output side of the switch circuit S2. One of the terminals of the capacitor C3 is connected to the cathode of the diode D3, and the other terminal of the capacitor C3 is grounded.

The pulse signal having a predetermined frequency generated in the oscillation circuit (not shown) is input to the switch circuits S1 and S2 as a drive signal. The switch circuits S1 and S2 switch the output state according to the level of the drive signal. For instance, the output voltage of the switch circuits S1 and S2 becomes Vcc in the period in which the drive signal is "H" level, and the output voltage of the switch circuits S1 and S2 becomes 0 in the period in which the drive signal is "L" level. The drive signal of "L" is input to the switch circuit S2 while the drive signal of "H" level is being input to the switch circuit S1, and the drive signal of "H" is input to the switch circuit S2 while the drive signal of "L" level is being input to the switch circuit S1.

The capacitor C1 is charged up to substantially Vcc through the diode D1 when the output voltage of the switch circuit S1 is 0 and the output of the switch circuit S2 is Vcc. When the output voltage of the switch circuit S1 is inverted to Vcc and the output voltage of the switch circuit S2 is inverted to 0, the potential at point e becomes a value obtained by adding Vcc to the charging voltage of the capacitor C1, that is, substantially 2Vcc. Therefore, the capacitor C2 is charged up to substantially 2 Vcc through the diode D2. Such a voltage may be smoothened through the diode D3 and the capacitor C3 to retrieve the boost voltage of substantially twice the power supply voltage Vcc from point g (boost voltage is smaller than 2Vcc because forward voltage drop on the diodes D1 to D3 occurs). According to a similar principle, the boost voltage of substantially three times the power supply voltage Vcc can be retrieved by adding another set of diode, capacitor, and switch circuit.

Figure 4:
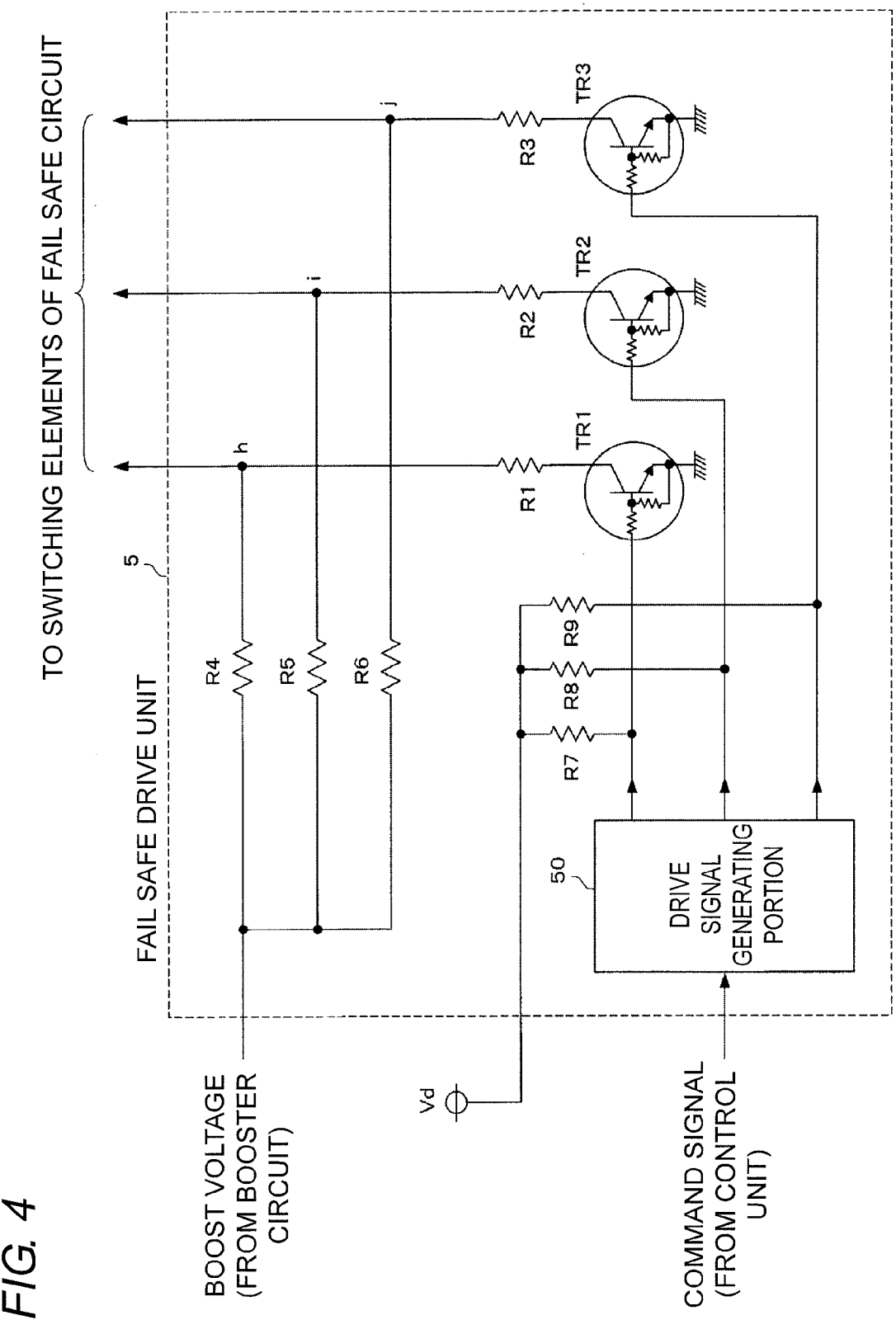
FIG. 4 is a circuit diagram showing one example of a fail safe drive unit according to one or more embodiments of the present invention.

The details of the fail safe drive unit 5 will now be described with reference to FIG. 4. The fail safe drive unit 5 includes a drive signal generating portion 50 for generating a drive signal according to a command signal (to be described later) output from the control unit 1, and transistors TR1 to TR3 that are turned ON/OFF by the drive signal generated by the drive signal generating portion 50. The transistors TR1 to TR3 are examples of control semiconductor switching elements in one or more embodiments of the present invention.

The respective one ends of the resistors R1 to R3 are connected to the collectors of the transistors TR1 to TR3, and the respective one ends of the resistors R4 to R6 are connected to the other ends of the resistors R1 to R3. The other ends of the resistors R4 to R6 are commonly connected, and the boost voltage is supplied from the booster circuit 7 to such connection point. Each connection point h, i and j of the resistors R1 to R3 and the resistors R4 to R6 is connected to the gates G of the switching elements Zu, Zv and Zw of the fail safe circuit 4 (FIG. 2). The respective one ends of the resistors R7 to R9 are connected to the bases of the transistors TR1 to TR3. The other ends of the resistors R7 to R9 are commonly connected, and the DC (Direct Current) voltage Vd is supplied to such connection point. The DC voltage Vd may be the power supply voltage Vcc of the power supply circuit 9, or may be the voltage obtained by dividing the power supply voltage Vcc. The emitters of the transistors TR1 to TR3 are grounded.

Figure 5:
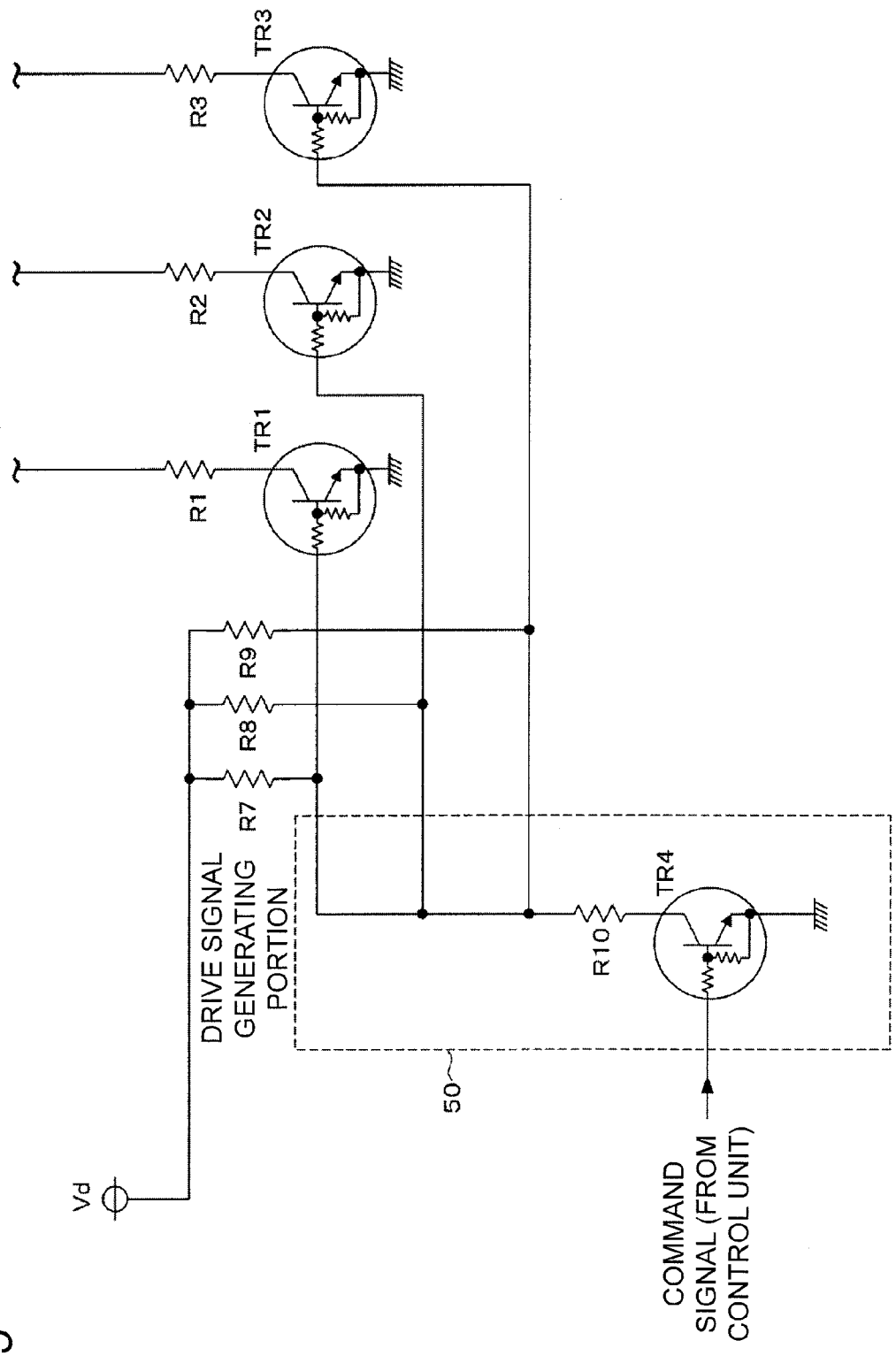
FIG. 5 is a circuit diagram showing one example of a drive signal generating portion according to one or more embodiments of the present invention.

As shown in FIG. 5, the drive signal generating portion 50 includes a transistor TR4 for switching. One end of the resistor R10 is connected to the collector of the transistor TR4, and the other end of the resistor R10 is commonly connected to the bases of the transistors TR1 to TR3. The emitter of the transistor TR4 is grounded. The command signal output from the control unit 1 is input to the base of the transistor TR4. The command signal is a signal for turning ON or OFF the switching elements Zu, Zv and Zw of the fail safe circuit 4.

The transistor TR4 is in the ON state when the command signal of "H" level is input from the control unit 1 to the base of the transistor TR4. The transistors TR1 to TR3 are then in the OFF state as the potential of the base lowers. When the transistors TR1 to TR3 are turned OFF, the potential of each point of h, i and j in FIG. 4 rises up to the boost voltage. Therefore, such boost voltage is applied to each gate G of the switching elements Zu, Zv and Zw of the fail safe circuit 4 as the "H" level signal, so that the switching elements Zu, Zv and Zw are in the ON state.

The transistor TR4 is in the OFF state when the command signal of "L" level is input from the control unit 1 to the base of the transistor TR4. The transistors TR1 to TR3 are then in the ON state as the potential of the base rises. When the transistors TR1 to TR3 are turned ON, the potential of each point of h, i and j in FIG. 4 is attracted to the ground side and lowers. Therefore, the boost voltage is no longer applied to each gate G of the switching elements Zu, Zv and Zw of the fail safe circuit 4, so that the switching elements Zu, Zv and Zw are in the OFF state.

Therefore, the boost voltage output from the booster circuit 7 is supplied to the fail safe drive unit 5, and the boost voltage is applied from the fail safe drive unit 5 to each gate G of the semiconductor switching elements Zu, Zv and Zw in cooperation with the operation of the transistors TR1 to TR3 of turning ON and OFF according to the command signal from the control unit 1. The boost voltage generated by the booster circuit 7 thus can be used as the drive voltage of the semiconductor switching elements Zu, Zv and Zw for fail safe.

The overall operation of the motor drive device 100 described above will now be described with reference to FIG. 2. The control unit 1 controls the power supply relay RY to the closed state. The power supply voltage is thus supplied from the power supply circuit 9 to the inverter drive unit 2 and the inverter circuit 3. As described above, the control unit 1 outputs a command signal for generating the PWM signal having a predetermined duty to the upper stage driver circuit 81 and the lower stage drive circuit 82. Each driver circuit 81 and 82 outputs the PWM signal generated based on such command signal to each gate of the upper stage switching elements Q1, Q3 and Q5 and the lower stage switching elements Q2, Q4 and Q6. The switching elements Q1 to Q6 then carry out the ON/OFF operation corresponding to the duty of the PWM signal, so that the inverter circuit 3 is in the operation state.

The control unit 1 also outputs a command signal for turning ON the switching elements Zu, Zv and Zw to the fail safe drive unit 5. In the fail safe drive unit 5, the transistor TR4 (FIG. 5) is turned ON and the transistors TR1 to TR3 (FIG. 5) are turned OFF by such command signal. As a result, the boost voltage of the booster circuit 7 is applied to each gate G of the switching elements Zu, Zv and Zw so that such switching elements are all turned ON, whereby the fail safe circuit 4 is in the conductive state.

In this state, the drive voltage of each phase is supplied from the power supply circuit 9 to the windings 6u, 6v and 6w of the motor 6 through the inverter circuit 3 and the fail safe circuit 4, thus rotating the motor 6. The steering assisting force is applied with respect to the handle by the rotation of the motor 6.

If abnormality occurs such as the circuit short circuits in the motor drive device 100 or the sensor arranged in the vehicle breaks down, the control unit 1 detects such abnormality. The control unit 1 then switches the power supply relay RY from the closed state to the opened state, and also outputs a command signal for stopping the operation of the inverter circuit 3 to the upper stage driver circuit 81 and the lower stage driver circuit 82 of the inverter drive unit 2. The inverter circuit 3 and the power supply circuit 9 are electrically separated when the power supply relay RY is switched to the opened state. The driver circuits 81 and 82 stop the output of the PWM signal to the inverter circuit 3 based on the command signal from the control unit 1. The switching elements Q1 to Q6 of the inverter circuit 3 are then all turned OFF.

Furthermore, the control unit 1 outputs a command signal for turning OFF the switching elements Zu, Zv and Zw to the fail safe drive unit 5. In the fail safe drive unit 5, the transistor TR4 is turned OFF and the transistors TR1 to TR3 are turned ON by such command signal. As a result, the boost voltage of the booster circuit 7 is no longer applied to each gate G of the switching elements Zu, Zv and Zw so that such switching elements are all turned OFF, whereby the fail safe circuit 4 is in the non-conductive state.

In this state, the current flow from the inverter circuit 3 to the motor 6 is shielded, and hence the drive voltage of each phase is not supplied to the windings 6u, 6v and 6w of the motor 6, and thus the motor 6 does not rotate. Therefore, the steering assisting force is also not applied.

The switching elements Zu, Zv and Zw of the fail safe circuit 4 may be turned OFF at the same timing as the switching elements Q1 to Q6 of the inverter circuit 3, or may be turned OFF a constant time after the switching elements Q1 to Q6 are turned OFF.

In FIG. 5, the transistors TR1 to TR3 for three phases are turned ON all together with one transistor TR4 to simultaneously turn OFF the switching elements Zu, Zv and Zw, but a circuit configuration of sequentially turning OFF such switching elements may be adopted.

According to the first embodiment described above, the boost voltage generated by the booster circuit 7 is supplied to the fail safe drive unit 5, so that the switching elements Zu, Zv and Zw for fail safe can be driven using such boost voltage. Therefore, a booster circuit for driving the switching elements does not need to be separately arranged, and the circuit configuration can be simplified.

According to the first embodiment, the booster circuit 7 and the driver circuit 8 are configured by a single ASIC, so that the inverter drive unit 2 can be miniaturized.

According to the first embodiment, the control unit 1 not only outputs the command signal for turning OFF the inverter circuit 3 but also controls the power supply relay RY to the opened state at the same time when abnormality occurs, and hence the inverter circuit 3 is electrically separated from the battery B. The inverter circuit 3 thus reliably achieves the operation stop state, and breakage can be prevented.

Figure 6:
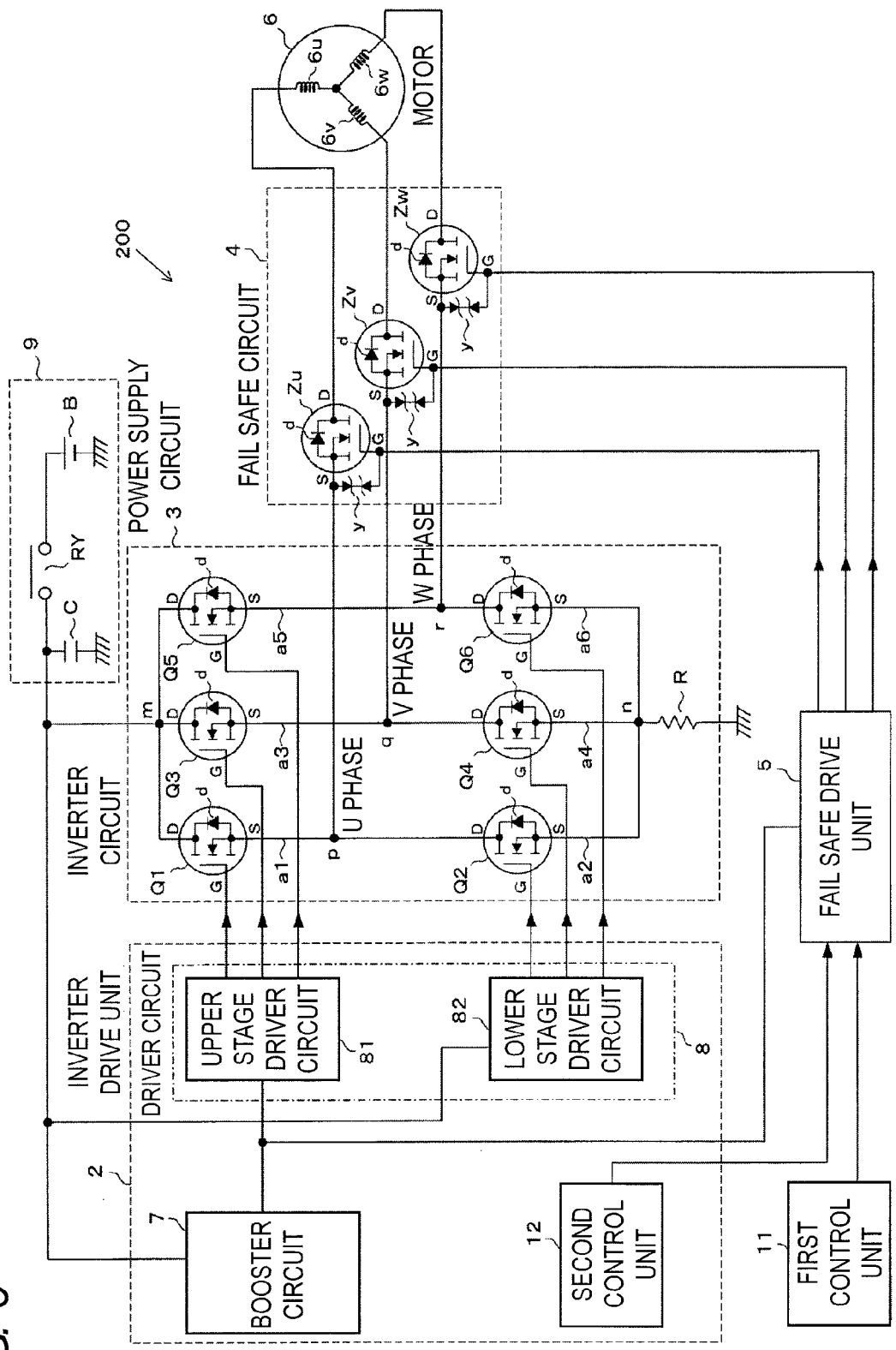
FIG. 6 is a circuit diagram showing a motor drive device according to a second embodiment of the present invention.

A second embodiment of the present invention will be described below with reference to FIG. 6. In a motor drive device 200 according to the second embodiment, the control unit is configured by a first control unit 11 and a second control unit 12. The first control unit 11 is the same as the control unit 1 (FIG. 2) of the first embodiment, and is configured by a CPU and is arranged separate from the ASIC configuring the inverter drive unit 2. The second control unit 12, on the other hand, is arranged inside the ASIC. The second control unit 12 outputs a command signal for turning ON or OFF the switching elements Zu, Zv and Zw of the fail safe circuit 4 with respect to the fail safe drive unit 5, similar to the first control unit 11. In other words, the fail safe drive unit 5 receives the command signal from the first control unit 11 (CPU) and the command signal from the second control unit 12 (ASIC).

Figure 7:
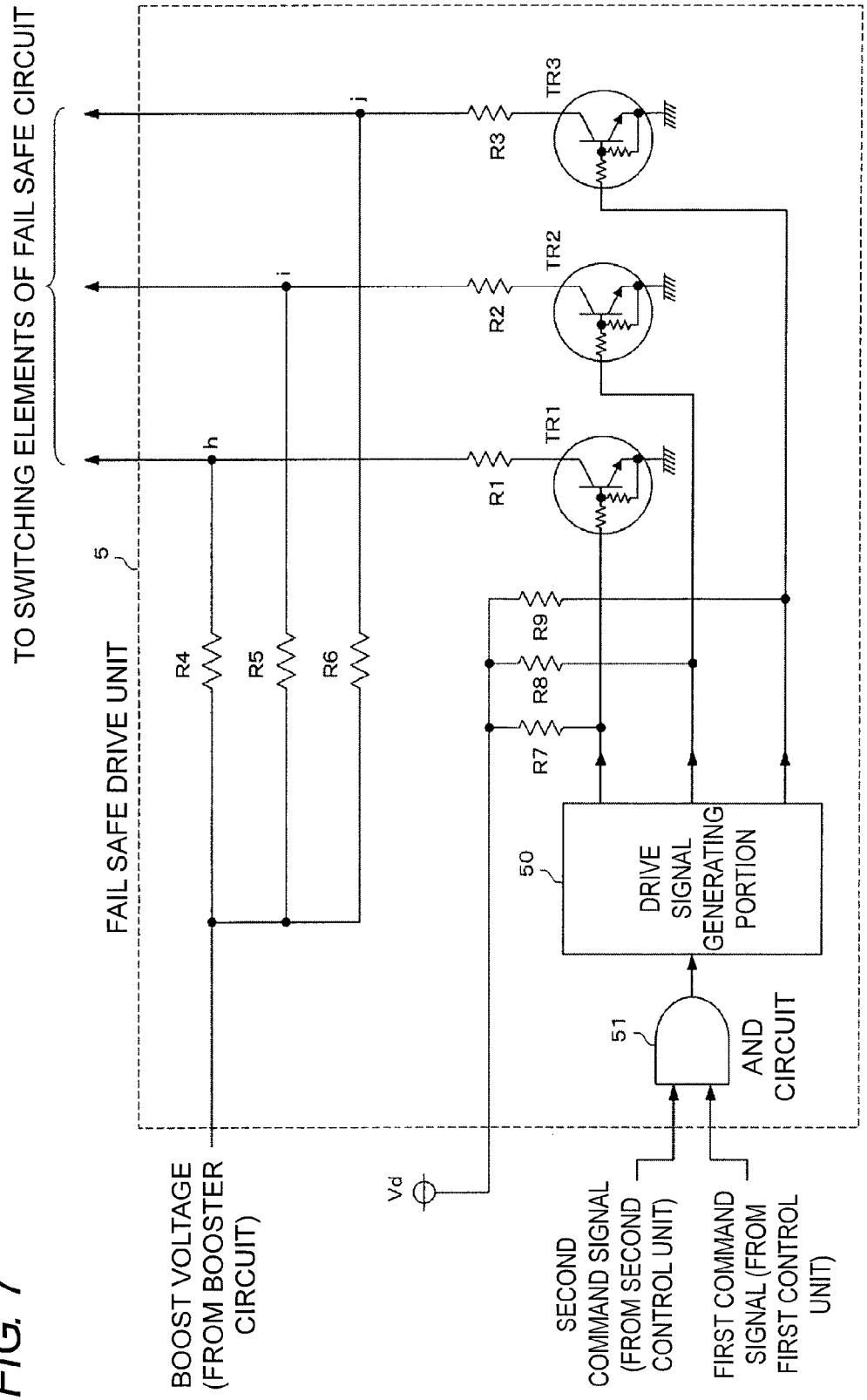
FIG. 7 is a circuit diagram showing one example of a fail safe drive unit in the second embodiment.

One example of the fail safe drive unit 5 in the second embodiment is shown in FIG. 7. In FIG. 7, an AND circuit 51 is arranged at the pre-stage of the drive signal generating portion 50. A first command signal from the first control unit 11 and a second command signal from the second control unit 12 are input to the AND circuit 51. Other portions are the same as the fail safe drive unit 5 (FIGS. 4 and 5) of the first embodiment.

The inverter circuit 3, the fail safe circuit 4, the motor 6, the booster circuit 7, the driver circuit 8, and the power supply circuit 9 in the second embodiment are the same as the first embodiment, and thus the description thereof will be omitted.

In the second embodiment, if the command signal ("H" level signal) instructing to turn ON the switching elements Zu, Zv and Zw for fail safe is output from both the first control unit 11 and the second control unit 12, the output of the AND circuit 51 becomes "H". The transistor TR4 (FIG. 5) of the drive signal generating portion 50 is thus in the ON state and the transistors TR1 to TR3 are in the OFF state, so that the boost voltage is applied to the gates G of the switching elements Zu, Zv and Zw, and such switching elements are in the ON state.

If the command signal instructing to turn ON the switching elements Zu, Zv and Zw is not output from one of (or both) the first control unit 11 and the second control unit 12, the output of the AND circuit 51 becomes "L". The transistor TR4 of the drive signal generating portion 50 is thus in the OFF state and the transistors TR1 to TR3 are in the ON state, so that the boost voltage is not applied to the gates G of the switching elements Zu, Zv and Zw, and such switching elements are in the OFF state.

Therefore, if either one of (or both of) the first and second control units 11 and 12 breaks down, the fail safe drive unit 5 does not turn ON the switching elements Zu, Zv and Zw for fail safe, and thus the current flow to the motor 6 is shielded and the reliability is enhanced.

In the second embodiment described above, the booster circuit for driving the switching elements Zu, Zv and Zw does not need to be separately arranged and the circuit configuration can be simplified because the boost voltage generated by the booster circuit 7 is supplied to the fail safe drive unit 5. Other effects of the second embodiment are the same as the first embodiment, and thus the description will be omitted.

Figure 8:
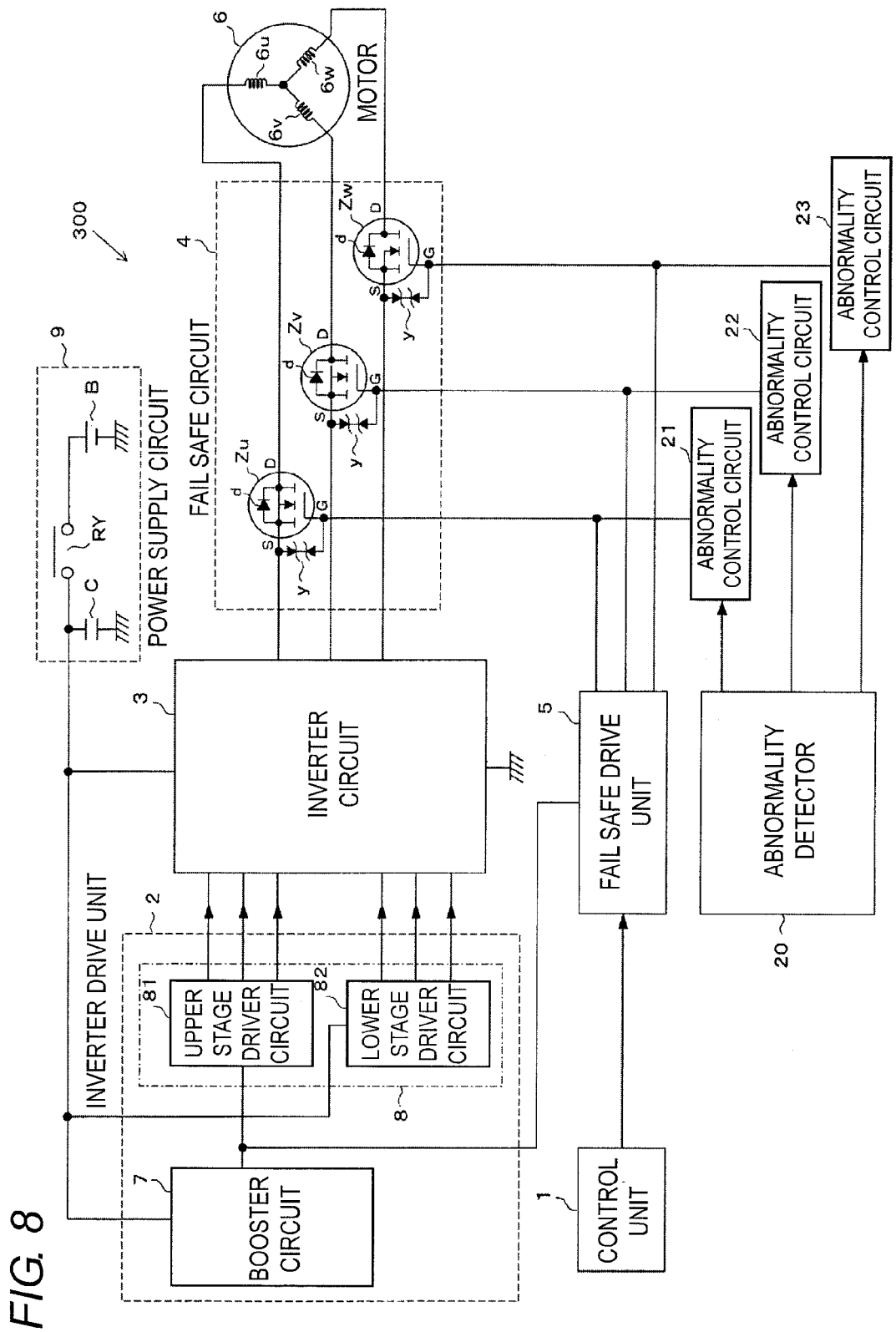
FIG. 8 is a circuit diagram showing a motor drive device according to a third embodiment of the present invention.

A third embodiment of the present invention will now be described with reference to FIG. 8. In a motor drive device 300 according to the third embodiment, an independent abnormality detector 20 is arranged separate from the control unit 1. Abnormality control circuits 21 to 23 that operate based on the output of the abnormality detector 20 are also arranged. The abnormality control circuits 21 to 23 include a semiconductor switching element (not shown) such as a transistor or a MOS-FET.

The abnormality detector 20 detects the abnormality that occurs in the motor drive device 300 and the vehicle. The abnormality includes short circuit and breakage of the circuit, the failure of the CPU configuring the control unit 1, the failure of the motor 6, the failure of the sensor, and the like, but is not limited thereto, and includes various abnormalities. When the abnormality detector 20 detects abnormality, the abnormality detector 20 outputs an abnormality detection signal to the abnormality control circuits 21 to 23. The abnormality control circuits 21 to 23 turn ON or OFF the switching element based on the abnormality detection signal from the abnormality detector 20 to prohibit the boost voltage from being applied to each gate G of the switching elements Zu, Zv and Zw from the fail safe drive unit 5.

Therefore, when some kind of abnormality occurs, the switching elements Zu, Zv and Zw for fail safe are turned OFF so that the current flow from the inverter circuit 3 to the motor 6 is shielded and the fail safe function is guaranteed.

The abnormality control circuits 21 to 23 are arranged with respect to the switching elements Zu, Zv and Zw for fail safe, and hence the switching elements Zu, Zv and Zw can be individually controlled. Therefore, even if one of the abnormality control circuits 21 to 23 fails, the switching element corresponding to another abnormality control circuit can be turned OFF, and thus the fail safe function further enhances.

The portions other than the abnormality detector 20 and the abnormality control circuits 21 to 23 in the third embodiment are the same as the first embodiment, and thus the description will be omitted.

In the third embodiment described above as well, the booster circuit for driving the switching elements Zu, Zv and Zw does not need to be separately arranged and the circuit configuration can be simplified by supplying the boost voltage generated by the booster circuit 7 to the fail safe drive unit 5. Other effects of the third embodiment are the same as the first embodiment, and thus the description thereof will be omitted.

Figure 9:
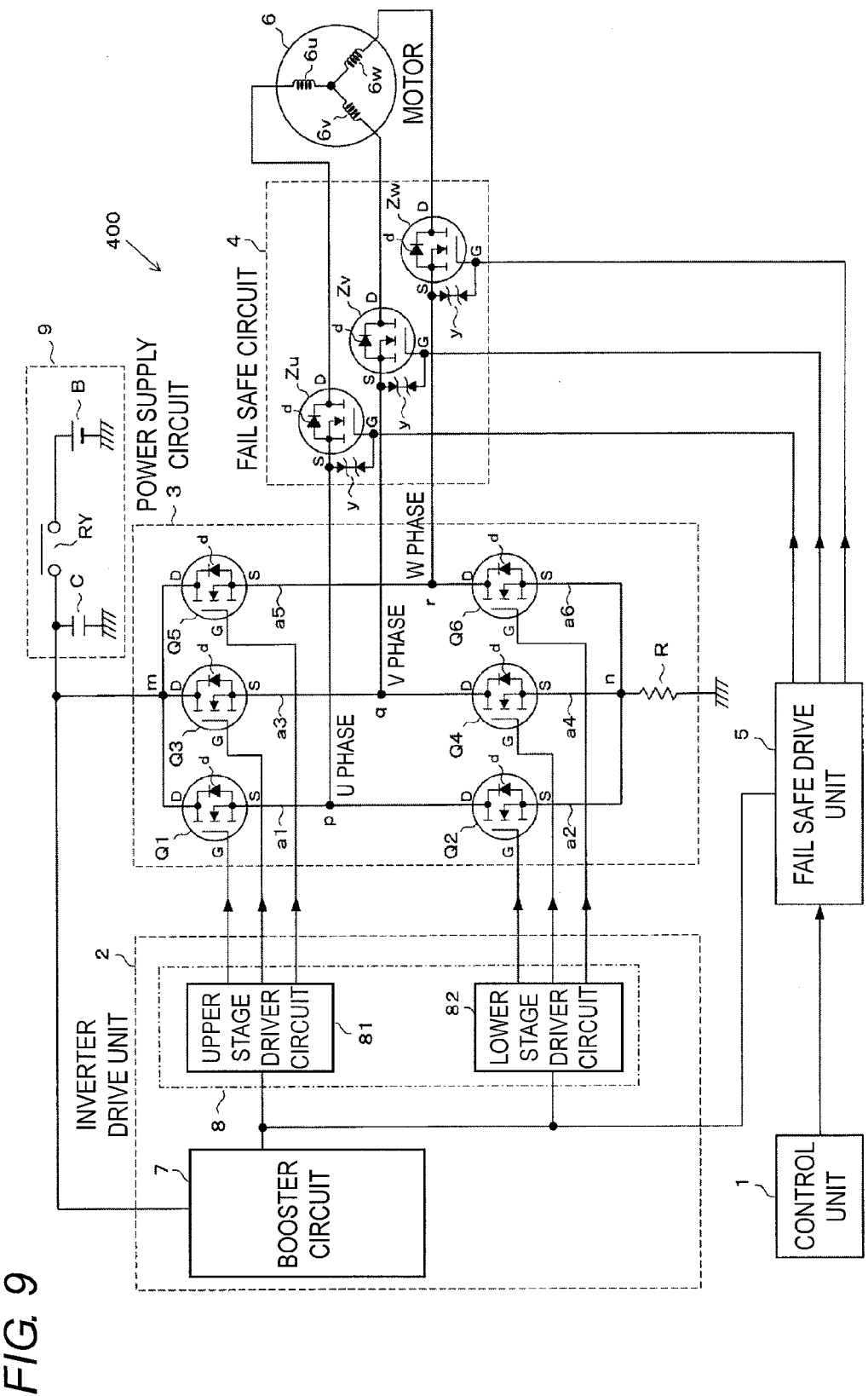
FIG. 9 is a circuit diagram showing a motor drive device according to a fourth embodiment of the present invention.

A fourth embodiment of the present invention will be described with reference to FIG. 9. In a motor drive device 400 according to the fourth embodiment, the boost voltage output from the booster circuit 7 is supplied to the upper stage driver circuit 81 and the fail safe drive unit 5, similar to the first to third embodiments, and, is also supplied to the lower stage driver circuit 82. Other configurations are the same as the first embodiment, and thus the description thereof will be omitted.

The N channel MOS-FET configuring the lower stage switching elements Q2, Q4 and Q6 of the inverter circuit 3 does not require a high gate voltage. However, if the voltage fluctuation of the battery B is large, the necessary voltage is not applied to the gates G of the switching elements Q2, Q4 and Q6, and the inverter circuit 3 may possibility malfunction. The boost voltage from the booster circuit 7 is thus supplied to the lower stage driver circuit 82 so that a constant voltage or more is always applied to the gates G of the switching elements Q2, Q4 and Q6 and the malfunction of the inverter circuit 3 can be prevented.

In the fourth embodiment described above as well, the booster circuit for driving the switching elements Zu, Zv and Zw does not need to be separately arranged and the circuit configuration can be simplified by supplying the boost voltage generated by the booster circuit 7 to the fail safe drive unit 5. Other effects of the fourth embodiment are the same as the first embodiment, and thus the description thereof will be omitted.

Various embodiments other than those described above can be adopted in the present invention. Examples are given below.

In each embodiment described above, an example in which the charge pump type booster circuit is used for the booster circuit 7 has been described (FIG. 3), but a booster circuit of chopper type, or a booster circuit of other types may be used.

An example in which the control unit 1 is arranged separate from the ASIC (inverter drive unit) 2 has been described in FIG. 1, but the control unit 1 may be incorporated in the ASIC. In FIG. 6, the second control unit 12 is incorporated in the ASIC, but the second control unit 12 may be arranged separate from the ASIC. Furthermore, the first control unit 11 and the second control unit 12 may both be incorporated in the ASIC in FIG. 6. An example in which the transistors TR1 to TR4 are used for the switching elements has been described in FIG. 5, but the MOS-FET may be used instead of the transistor.

An example in which the power supply relay RY is arranged in the power supply circuit 9 has been described in each embodiment above, but a semiconductor switching element for a large current switching may be used instead of the power supply relay RY.

The N channel MOS-FET is used for the switching element in each embodiment described above, but other switching elements such as an IGBT (Insulated Gate Bipolar Transistor) may be used.

An example in which the three phase motor is used as the motor 6 has been described in each embodiment above, but one or more embodiments of the present invention can be applied to a device for driving a two phase motor or a multiphase motor of four or more phases.

An example in which the brushless motor is used as the motor 6 has been described in each embodiment above, but one or more embodiments of the present invention can be applied to a device for driving an inductive motor, a synchronous motor, or the like.

An example in which one or more embodiments of the present invention is applied to the motor drive device used in the electric power steering device of the vehicle has been described in each embodiment above, but one or more embodiments of the present invention may be applied to the motor drive device, in general, that includes a fail safe circuit between the inverter circuit and the motor.

While the invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. The motor drive device comprising:
an inverter circuit comprising a plurality of sets of a pair of upper and lower arms,
   wherein the plurality of sets of the pair of upper and lower arms comprise a semiconductor switching element on an upper arm and a lower arm, respectively, and
   wherein the plurality of sets of the pair of upper and lower arms are arranged for supplying power to a motor based on an ON/OFF operation of each semiconductor switching element by a PWM (Pulse Width Modulation) signal;
a driver circuit for outputting the PWM signal to each semiconductor switching element of the inverter circuit;
a booster circuit for boosting a power supply voltage, and supplying the boost voltage to the driver circuit;
a semiconductor switching element for fail safe, arranged between the inverter circuit and the motor, for shielding current flow from the inverter circuit to the motor;
a fail safe drive unit for outputting a signal for turning ON/OFF the semiconductor switching element for fail safe; and
a control unit for outputting a command signal for turning ON or OFF the semiconductor switching element for fail safe with respect to the fail safe drive unit,
wherein the boost voltage output from the booster circuit is also supplied to the fail safe drive unit;
wherein the fail safe drive unit drives the semiconductor switching element for fail safe by the boost voltage supplied from the booster circuit;
wherein the fail safe drive unit comprises:
   a drive signal generating portion for generating a drive signal corresponding to the command signal of the control unit, and
   a semiconductor switching element for control which is turned ON/OFF by the drive signal generated by the drive signal generating portion; and
wherein the semiconductor switching element for fail safe is driven by the boost voltage based on the operation of the semiconductor switching element for control.

2. The motor drive device according to claim 1,
wherein the booster circuit and the driver circuit are configured by a single ASIC,
wherein the control unit comprises a first control unit and second control unit,
wherein the first control unit is arranged separate from the ASIC,
wherein the second control is arranged inside the ASIC, and
wherein when a command signal input from the first control unit and a command signal input from the second control unit are both signals instructing to turn ON the semiconductor switching element for fails safe, the fail safe drive unit turns ON the semiconductor switching element.

3. The motor drive device comprising:
an inverter circuit comprising a plurality of sets of a pair of upper and lower arms,
   wherein the plurality of sets of the pair of upper and lower arms comprise a semiconductor switching element on an upper arm and a lower arm, respectively, and
   wherein the plurality of sets of the pair of upper and lower arms are arranged for supplying power to a motor based on an ON/OFF operation of each semiconductor switching element by a PWM (Pulse Width Modulation) signal;
a driver circuit for outputting the PWM signal to each semiconductor switching element of the inverter circuit;
a booster circuit for boosting a power supply voltage, and supplying the boost voltage to the driver circuit;
a semiconductor switching element for fail safe, arranged between the inverter circuit and the motor, for shielding current flow from the inverter circuit to the motor; and
a fail safe drive unit for outputting a signal for turning ON/OFF the semiconductor switching element for fail safe,
wherein the boost voltage output from the booster circuit is also supplied to the fail safe drive unit;
wherein the fail safe drive unit drives the semiconductor switching element for fail safe by the boost voltage supplied from the booster circuit;
wherein each semiconductor switching element of the inverter circuit is configured by an N channel MOS-FET (Metal Oxide Semiconductor Field Effect Transistor);
wherein the driver circuit comprises an upper stage driver circuit for outputting the PWM signal with respect to an MOS-FET arranged on the upper arm of the inverter circuit, and the driver circuit also comprises a lower stage driver circuit for outputting the PWM signal with respect to an MOS-FET arranged on the lower arm of the inverter circuit; and
wherein the booster circuit supplies a boost voltage to the upper stage driver circuit and the fail safe drive unit.

* * * * *